United States Patent [19]

Schrock

[11] Patent Number: 4,473,318
[45] Date of Patent: Sep. 25, 1984

[54] PASSIVE STRUCTURES TUBING CONNECTOR TERMINAL

[75] Inventor: Jesse C. E. Schrock, Seattle, Wash.

[73] Assignee: The Boeing Company, Seattle, Wash.

[21] Appl. No.: 507,150

[22] Filed: Jun. 23, 1983

[51] Int. Cl.³ .............................................. B25G 3/00
[52] U.S. Cl. .................................... 403/404; 403/206; 403/49
[58] Field of Search ................ 403/206, 49, 262, 383, 403/388, 199, 404; 52/693

[56] References Cited

U.S. PATENT DOCUMENTS

| | | |
|---|---|---|
| 918,399 | 4/1909 | Uebbing . |
| 1,380,659 | 6/1921 | Layman . |
| 1,418,083 | 5/1922 | Layman . |
| 2,100,965 | 11/1937 | Kuskie . |
| 2,159,859 | 5/1939 | Nickelsen . |
| 2,253,032 | 8/1941 | Keller . |
| 2,274,507 | 2/1942 | Taylor . |
| 2,804,679 | 9/1957 | Tracy . |
| 2,860,527 | 11/1958 | Fritz . |
| 3,017,208 | 1/1962 | Wyse ..................................... 403/49 |
| 3,121,348 | 2/1964 | Reed . |
| 3,248,776 | 5/1966 | Brewster . |
| 3,353,320 | 11/1967 | Grasis ..................................... 52/693 |
| 3,818,746 | 6/1974 | Fujita . |
| 3,900,294 | 8/1975 | McCloskey . |
| 4,094,116 | 6/1978 | Gilb ................................. 403/388 X |
| 4,202,082 | 5/1980 | Williams . |

FOREIGN PATENT DOCUMENTS 210469  1/1967  Sweden ............................. 403/199

Primary Examiner—Andrew V. Kundrat
Attorney, Agent, or Firm—Christensen, O'Connor Johnson & Kindness

[57] ABSTRACT

A fatigue-resistant terminal for tubing used in passive structures by which the tubing member of the structure may be bolted or otherwise fastened in face-to-face contact with another member of the structure. The connector terminal contact face on one side of the connector is formed in a plane containing the adjacent-side tangency plane of the tubing and is formed on its opposite side by a trough-like depression that progressively deepens and widens endwise of the connector and that bottoms in a flattened area adjoined on opposite sides by upright shoulders or flanges attendantly formed from the cross-sectionally remaining tubing material along the depression and flattened area.

8 Claims, 12 Drawing Figures

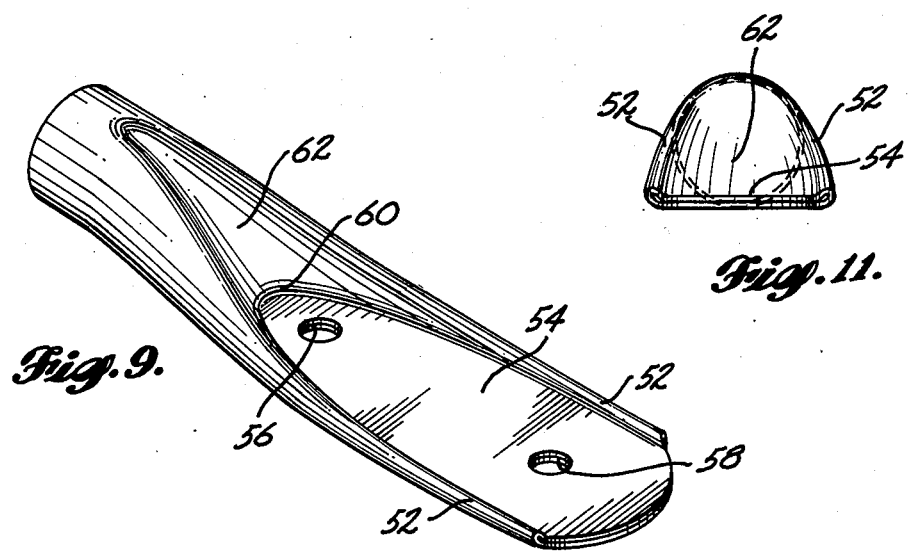
Fig. 9.
Fig. 11.
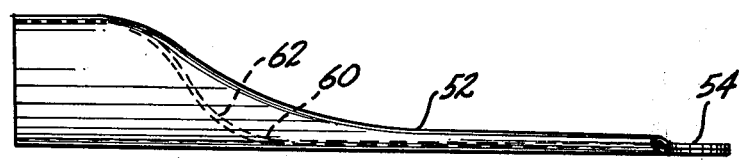
Fig. 10.
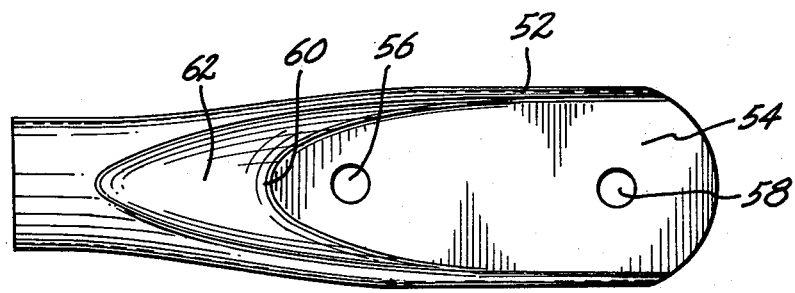
Fig. 12.

PASSIVE STRUCTURES TUBING CONNECTOR TERMINAL

BACKGROUND OF THE INVENTION

This invention relates to a new and improved tubing connector terminal applicable to metal tubing used as a brace, tension link, or tie member in any of a variety of configurations of the tubing serving as an element in passive structures. The invention, in its preferred forms as herein illustratively described, was conceived and developed for tubing used in a number of places and in varying configurations as elements of aircraft jet engine "surrounds" or buildup assemblies that carry, brace or tie down many of the elements auxiliary to the engine within its cowling. The invention is herein illustratively described by reference to its presently preferred embodiments for such purposes; however, it will be recognized that modifications and changes therein may be made without departing from the essential features involved.

Conventional practice for years in providing tubing used as an element in passive structural applications has been to flatten the tubing end to form a dual wall thickness, single-plane cross section termination that could be drilled for bolting or riveting or that could be welded in face-to-face contact with an opposing flat surface of another element in the passive structure. While an acceptable technique for many applications, the former practice has been recognized in others as unreliable, due to early and often totally unexpected structural fatigue failure of the connector terminal. Such fatigue failure was found to occur in the single-plane cross section region of the terminus. In addition, the single-plane cross section terminus would not carry loads in bending, and it left considerable offset between the contact face of the terminus and the adjacent side tangency plane of the tubing precluding or making it difficult to position the tubing side against and along the other member to which it was fastened. In consequence, the potential advantages offered by the use of tubing in passive structures, namely strength combined with lateral stiffness, lightness of weight and cost-effectiveness, otherwise continuing to favor its use where possible, particularly in aircraft structures where those qualities are critically important, were not consistently available to the structure's designer.

In addressing the problem, it was noted in accordance with this invention that fatigue failures in the single-plane cross section of the flattened tubing end even occurred in applications wherein the tubing side cleared the adjoining member and the fastener means between them was ostensibly loaded in pure shear by the tubing.

The principle object of this invention is to provide an effective solution to the described problem, namely, avoidance of tubing terminal connector fatigue failure; also avoidance of the former restrictive limitations on the use of tubing as elements in passive structures. In addition, auxiliary advantages are afforded; in particular, stiffness and strength against transverse bending loads should they also have to be carried by the tubing connector terminal.

The improved connector terminal, apart from static or passive structure loading also is much more durable and fatigue-free to withstand vibrational load stresses as occur in aircraft engine auxiliary structure applications and similar uses, this representing a highly important additional advantage.

SUMMARY OF THE INVENTION

The invention features a specially configured tubing connector terminal most conveniently and preferably formed from a separate length of tubing of the same size and shape as the main tubing and butt-welded to it end to end. The forming process entails initiating from the round exterior form, a progressively deepening and widening trough-like depression, bottoming in a widened, flattened area. Attendantly, longitudinally sloping shoulders, formed along the sides of the depression from the cross-sectionally remaining tubing wall material, progressively narrow to extend as flanges upstanding along opposite edges of the flattened area. The result is an accessible pocket or recess opening endwise as well as laterally of the connector terminal. The exterior side of the tubing connector generally opposite said pocket is itself progressively flattened endwise, and in such a manner as to lie in parallel proximity to the flattened area and to present a substantially flat contact face in the tangency plane of the tubing for interfacing with a flat structural member. The connector terminal is thus configured to permit positioning the adjoining tubing along and against the structural member. With the connector terminal formed of a length of the same tubing as preferred, the flattened area and contact face are separated by two wall thicknesses of tubing.

Depending upon application and the type of fastener used to secure the connector terminal to an adjoining structure member, the ratio of width of the pocket bottom or flattened area to the height of the adjoining side flanges or shoulders may be increased or decreased by design, as may the proportionate length of the shoulders to the length of the flattened area forming the base of the pocket as it projects to the tip of the connector terminal. In a form of the invention in which the shoulders diverge at a relatively wide angle and abruptly decrease in height above the flattened area pocket bottom, the connector terminal has been referred to as a flared-pocketed terminal. Such a design affords the most open access to insert or remove a bolt or other fastener through a hole in the terminal or to apply a tool to the fastener head. The term "straight-pocketed" has been applied to connector terminals with longer and higher shoulders that approach parallel relationship separated by a narrower pocket bottom or flattened area.

These and other variations will be evident as the description proceeds, applied to the two illustrated embodiments, one representing a flared-pocketed tubing terminal and the other two straight-pocketed tubing terminals.

Figure 1:
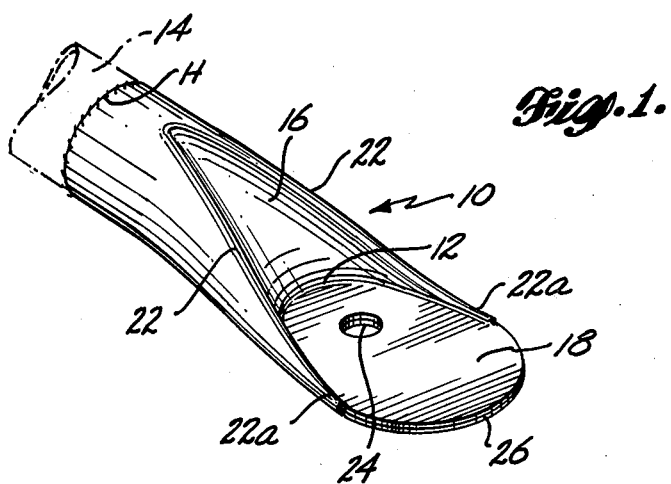
FIG. 1 is a perspective view of a flared-pocketed tubing connector terminal taken from a side aspect above and beyond the end thereof.

In defining the viewing aspect (i.e., what is "top") with respect to the drawing figures as above, it is assumed that the structural member interfacing surface of the connector terminal is its flat, exterior bottom face and that the pocket formed between the side shoulders or flanges faces upward.

DETAILED DESCRIPTION

Figures 2, 3:
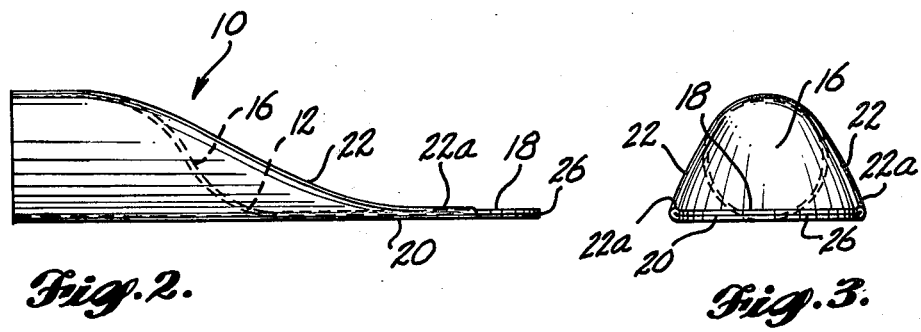
FIG. 2 is a side view.
FIG. 3 is an end view.
Figure 4:
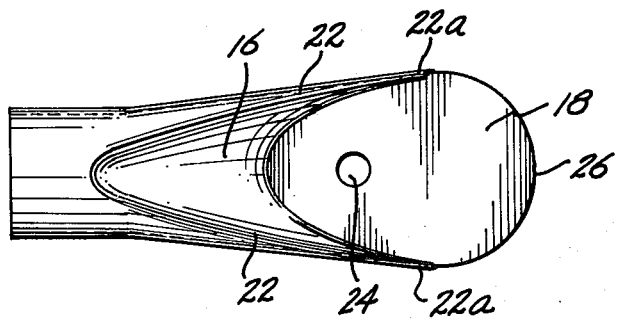
FIG. 4 is a top view of the same flared-pocketed terminal.

Referring first to FIGS. 1 through 4, the connector terminal 10 comprises a length of round, cylindrical metal tubing adapted after formation of the connector terminal to be butt-welded at H to a coaligned length of passive structure tubing 14 of the same exterior shape and size and preferably of the same material. For the application in passive structures surrounding aircraft jet engines, as described above, both the connector and the adjoining tubing that it terminates are preferably of corrosion-resistant steel (i.e., stainless steel). In forming the connector terminal of a length of such tubular material, the tubing is progressively converted from the round cross section commencing at a suitable distance from the base end that is to be welded or otherwise joined (such as by telescoping inside or over) to the main tubing 14 using suitable forming dies. On one side, such as the upper side, as shown in the drawings, the conversion is initiated through a deepening, sloping and widening trough-like depression 16 bottoming in a flared endwise extending flattened area 18. The flattened area 18 is formed in a plane substantially parallel to and adjacent the tangency plane of the opposite side of the tubing material 20. The described trough-like depression lies between adjoining, attendantly formed, longitudinally sloping shoulders 22 that progressively narrow initially and that extend as flanges 22a upstanding along opposite edges of the flattened area 18. Together, an upwardly and endwise opening pocket is defined by the side flanges and by the depression 16 as well as the flattened bottom area 18. A fastener hole 24 is formed in the flattened area 18 to receive a bolt or rivet at a location midway between the flanges 22a. Obviously, a fastener hole may not be needed or used if welding is the means of fastening.

The flattened area 18, flaring in width between shoulders, extends to the end extremity of the fitting 26, which is preferably convexly rounded, such as approximately on an arc centered on the bolt hole axis so as to clear adjoining components uniformly with changes of tubing orientation about the hole axis. The rounding commences at the sides of the fitting where the ribs or flanges 22a terminate. The bolt hole 24 is located, longitudinally of the terminal, approximately midway between the tips of the flanges 22a and the base 28 of the pocket taken along the centerline of the terminal. The base of the pocket, representing the inner edge of the flattened area 18, diverges or flares at an acute angle of approximately 40 degrees in the example. Because of this relatively wide divergence angle and the shortness and low height of the flanges adjoining the flattened area, access to the head of a bolt, or to a fastener element of some other type inserted in or to be inserted in the hole 24, including the application of a wrench or other tool to tighten the connection, is most convenient.

On the side of the connector terminal opposite the flattened area 18, that is, on the bottom side 20, tubing material is formed in the die-molding process into a flattened contact face underlying the flattened area 18 and lying in a face plane that is a continuation of the bottom tangency plane of the tubing. The configuration allows the flat bottom surface of the connector terminal to interface directly with a flat surface of a passive structure member while allowing the adjoining tubing 14 itself, if desired, to lie along and against the member.

As will be noted, the formation of shoulders or flanges characterizing the connector terminal, and which extend endwise beyond the location of the fastener hole 24, greatly stiffens the fastened terminal against static bending loads. Primarily for purpose of the invention, however, it greatly reduces bending flexures and resultant fatigue failures found to occur in the interface area 32 due to vibrational stresses picked up by the tubing in installations wherein bending loads are not normally expected or caused by design. Moreover, the improved terminal provides greater versatility in the permissive placement and orientation of the fastened tubing in a passive structure. It permits mounting the tubing against and along an associated flat structural member, for example. With such orientation and positioning, the adjoining flat structural member can, in effect, serve with the tubing in a mutually supportive relationship further improving the strength and durability of the tubing and its terminal in such installations. By actually strapping or otherwise securing the tubing itself to the adjoining flat structural member, as permitted in such installations with the improved connector terminal, stiffness against bending and against vibrational flexure causing fatigue failure in the single-plane, cross-sectional portion of the terminal is further enhanced.

Figure 5:
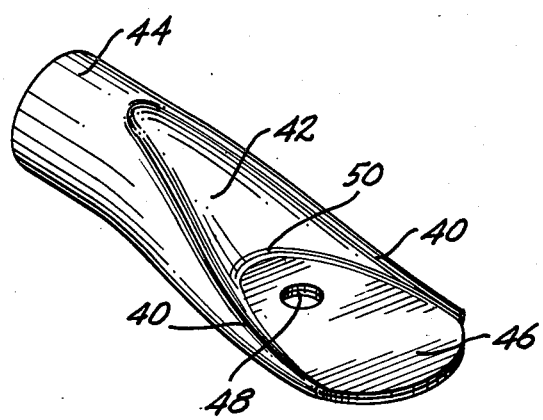
FIGS. 5, 6, 7, and 8 are respectively perspective, side, end, and top views of a straight-pocketed version of a tubing connector terminal according to the invention; and, FIGS. 9, 10, 11, and 12 are views corresponding to FIGS. 5, 6, 7, and 8 but, in this case, illustrating an extended straight-pocketed tubing connector terminal.
Figure 6:
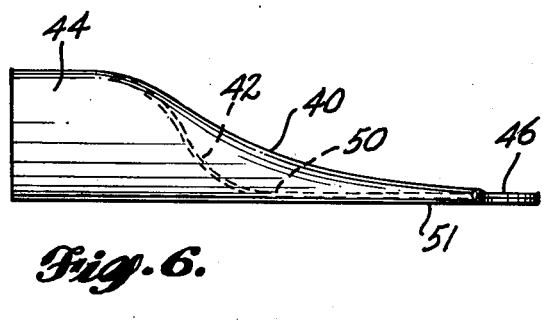
Figure 7:
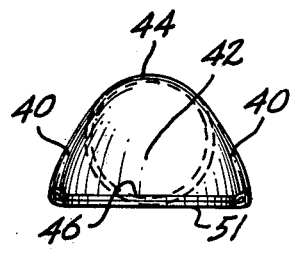
Figure 8:
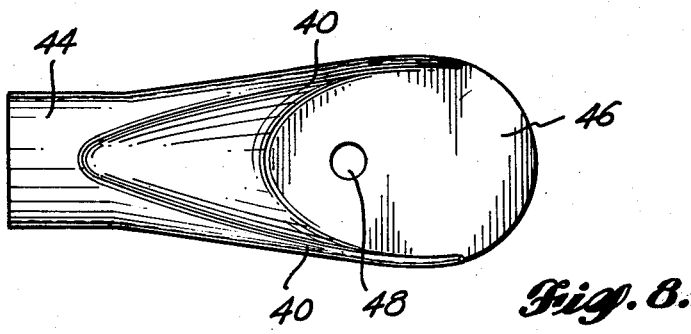

In the straight-pocketed embodiment depicted in FIGS. 5 through 8, the general formation and effect are essentially the same as or similar to those in FIGS. 1 through 4. In this instance, however, the opposite shoulders 40 commencing in their molding along opposite sides of the trough 42 from the round cylindrical base portion 44 are formed to stand up higher from the flattened area 46 and to extend more nearly out to the tip extremity of the terminal. As a result, with additional material taken up in the shoulders or flanges 40, the distance between them, that is, the width of the flattened area 46 between flanges is decreased. Nevertheless, the connector terminal is stronger in longitudinal bending about any fastener used in hole 48 to secure the terminal to an associated passive structural member. It will be noted in comparing the configurations of the flared-pocketed and straight-pocketed versions (especially comparing FIG. 4 with FIG. 8) that in the latter the side shoulders diverge at a much lesser angle in approaching the flattened area 48 and that they approach and may even pass parallelism to reconverge, if desired. In this configuration, the price paid for a longer, more stiffened cross section is simply the lesser width of the connector terminal across its maximum transverse span (parallel to the flattened area 48 and the underlying interface contact surface 51) as well as somewhat reduced accessibility from the topside to insert and remove fasteners in hole 48 between flanges and to apply tools to the heads of such fasteners.

In the alternative straight-pocketed configuration depicted in FIGS. 9 through 12, the emerging side flanges 52 formed in the molding process are even longer in relation to the width of the flattened area 54 between flanges. In this instance, two longitudinally spaced fastener holes 56 and 58 are employed, the former near the junction 60 of the flattened area 54 and the trough-like depression 62 and the latter near the outer end or extremity of the connector terminal.

It will be seen that tubing connector terminals made according to the invention may vary in specific proportions of parts and details of design, and it is therefore intended in the claims that follow to cover the same along with the full reasonable range of equivalents.

The embodiments of the invention in which an exclusive property or privilege is claimed are defined as follows:

1. A tubing connector terminal characterized in its exterior cross-sectional configuration by a generally progressive endwise conversion from round, cylindrical form through a deepening, sloping and widening trough-like depression on one side bottoming in a flared, endwise extending flattened area lying substantially in a plane parallel to and adjacent the tangency plane of the opposite side of said round cylindrical form, and through attendantly formed, longitudinally sloping, side shoulders progressively narrowing to form flanges upstanding and extending along opposite edges of said flattened area so as to form a fastener access pocket, the exterior side of said tubing connector terminal generally opposite said access pocket being progressively flattened and flared endwise to form a substantially flat contact face in said tangency plane for interfacing with a flat surface of a passive structure member.

2. The tubing connector terminal defined in claim 1 wherein at least one fastener hole is formed through the terminal in the flattened area between the flanges.

3. The tubing connector terminal defined in claim 1 or 2 wherein the tubing connector terminal is formed of metal tubing.

4. The tubing connector terminal defined in claim 1 or 2 formed of a separate length of round metal tubing adapted to be joined to a length of similar tubing as an endwise continuation thereof.

5. The tubing connector terminal defined in claim 1, 2 or 3 wherein the flattened area adjoined by the side shoulders progressively widens to the ends of the shoulders.

6. The tubing connector terminal defined in claim 1, 2 or 3 wherein the flattened area adjoined by the side shoulders progressively widens to the ends of the shoulders and extends beyond such ends in a convexly rounded form in the plane of said flattened area.

7. The tubing connector terminal defined in claim 1, 2 or 3 wherein the flattened area adjoined by the side shoulders first flares in width, then progressively approaches parallelism of opposite sides thereof.

8. A fatigue-resistant connector terminal for tubing used in passive structures by which tubing joined thereto may be bolted or otherwise secured in face-to-face contact with another member of the structure, said terminal comprising a length of tubing formed with a substantially flat contact face on one side in a plane containing the adjacent-side tangency plane of the tubing and flaring endwise to a width at least substantially the diameter of the tubing, and having a fastener access pocket formed in its opposite side overlying said contact face, commencing with a trough-like depression that progressively deepens and widens endwise and that bottoms in a flattened area that initially flares transversely of the tubing, said flattened area extending lengthwise substantially to the end of the connector and being adjoined along opposite sides over a portion of the length thereof by upstanding stiffener flanges that constitute narrowed lengthwise continuations of shoulders formed along opposite sides of the depression and thereafter the flattened area from the cross-sectionally remaining material of the tubing.

* * * * *